United States Patent
Uchiyama et al.

(10) Patent No.: US 10,669,389 B2
(45) Date of Patent: Jun. 2, 2020

(54) POLYLACTIC ACID FOAM MOLDING MATERIAL, FOAM-MOLDED ARTICLE THEREOF AND METHOD FOR PRODUCING SAME

(71) Applicant: BIOLOGIQ, INC., Idaho Falls, ID (US)

(72) Inventors: Kosuke Uchiyama, Miyazaki (JP); Yen-Ju Chou, Tainan (TW)

(*) Notice: Subject to any disclaimer, the term of this patent is extended or adjusted under 35 U.S.C. 154(b) by 327 days.

(21) Appl. No.: 15/755,464

(22) PCT Filed: Aug. 31, 2016

(86) PCT No.: PCT/JP2016/075524
§ 371 (c)(1),
(2) Date: Feb. 26, 2018

(87) PCT Pub. No.: WO2017/038881
PCT Pub. Date: Mar. 9, 2017

(65) Prior Publication Data
US 2018/0251622 A1   Sep. 6, 2018

(30) Foreign Application Priority Data
Aug. 31, 2015   (JP) .................................. 2015-170983

(51) Int. Cl.
| | | |
|---|---|---|
| *C08L 67/04* | (2006.01) | |
| *C08J 9/00* | (2006.01) | |
| *C08J 9/236* | (2006.01) | |
| *C08J 9/12* | (2006.01) | |
| *C08J 9/14* | (2006.01) | |
| *C08K 3/26* | (2006.01) | |
| *C08K 5/00* | (2006.01) | |
| *C08L 101/16* | (2006.01) | |

(52) U.S. Cl.
CPC ............. *C08J 9/236* (2013.01); *C08J 9/0061* (2013.01); *C08J 9/0066* (2013.01); *C08J 9/122* (2013.01); *C08J 9/141* (2013.01); *C08K 3/26* (2013.01); *C08K 5/0025* (2013.01); *C08L 67/04* (2013.01); *C08J 2201/026* (2013.01); *C08J 2203/06* (2013.01); *C08J 2203/08* (2013.01); *C08J 2367/04* (2013.01); *C08J 2467/04* (2013.01); *C08K 2003/265* (2013.01); *C08L 101/16* (2013.01); *C08L 2201/06* (2013.01)

(58) Field of Classification Search
CPC ........ C08J 9/0061; C08J 9/236; C08J 9/0066; C08J 2467/04; C08J 2203/08; C08K 2003/265; C08L 101/16; C08L 2201/06; C08L 64/04; C08L 2205/02; C08L 2205/025; C08L 2205/03; C08G 63/08; C08G 63/912
See application file for complete search history.

(56) References Cited

U.S. PATENT DOCUMENTS

| | | | |
|---|---|---|---|
| 8,420,746 | B2 | 4/2013 | Huang et al. |
| 8,921,434 | B2 | 12/2014 | Uchiyama |
| 9,017,587 | B2 | 4/2015 | Huang et al. |
| 9,157,712 | B2 | 10/2015 | Huang et al. |
| 2009/0270524 | A1 | 10/2009 | Yoshiyuki et al. |
| 2010/0181372 | A1 | 7/2010 | Huang |
| 2012/0017387 | A1 | 1/2012 | Huang et al. |
| 2013/0203877 | A1 | 8/2013 | Kosuke et al. |

FOREIGN PATENT DOCUMENTS

| | | |
|---|---|---|
| DE | 102009044403 | 8/2010 |
| JP | 2000-017037 A | 1/2000 |
| JP | 2002-155197 A | 5/2002 |
| JP | 2007-254522 A | 10/2007 |

(Continued)

OTHER PUBLICATIONS

Pavia et al., "Morphology and thermal properties of foams prepared via thermally induced phase separation based on polylactic acid," Journal of Cellular Plastics, 48(5) 399-407. (Year: 2012).*
Minima "Patents and Technical Publications" URL: https://minima.com/about-minima/company/patents-and-technical-publications/; accessed Oct. 3, 2018.
International Search Report for PCT/JP2016/075524 dated Dec. 6, 2016, 4pages.

*Primary Examiner* — Kara B Boyle
(74) *Attorney, Agent, or Firm* — Workman Nydegger

(57) ABSTRACT

The present invention economically provides a method and device for producing a high-viscosity polylactic acid foam molding material which is suitable for foam molding at a high expansion ratio, and a foam molded article having a high expansion ratio which is formed of said polylactic acid composition. A polylactic acid foam molding material having an MI value of 0.05-5, measured in accordance with JIS K7210 at 190° C. under a 21.6-kg load, is produced by physically or mechanically lowering the molecular weight and rebonding, in the presence of a supercritical inert gas, polylactic acid having a molecular weight in terms of polystyrene of 2,000,000 or higher by GPC measurement generated when three types of crosslinked polylactic acid (A), (B), and (C) having different component ratios of D and L isomers, obtained by reacting polylactic acid composed of D and L isomers with a crosslinking agent, are mixed in a weight ratio of 25-50:25-50:25-50 (where (A)+(B)+(C) =100) and the mixture is melted; and a foam molded article is produced by providing a grinding orifice on an injection molding machine or an extrusion molding machine, discharging from a die at a temperature from the softening point to 110° C., and foam molding.

16 Claims, 5 Drawing Sheets

(56) References Cited

FOREIGN PATENT DOCUMENTS

| | | | |
|---|---|---|---|
| JP | 2012-041400 | 3/2012 | |
| TW | 278637 | 10/2005 | |
| TW | 200900220 | 1/2009 | |
| TW | 316021 | 10/2009 | |
| TW | 201028342 | 8/2010 | |
| TW | 201028343 | 8/2010 | |
| TW | 201028344 | 8/2010 | |
| TW | 364362 | 5/2012 | |
| TW | 201522900 | 6/2015 | |
| WO | 99/21915 A1 | 5/1999 | |
| WO | 2011122626 A1 | 10/2011 | |
| WO | WO-2011122626 A1 * | 10/2011 | ........... B29C 44/586 |

* cited by examiner

POLYLACTIC ACID FOAM MOLDING MATERIAL, FOAM-MOLDED ARTICLE THEREOF AND METHOD FOR PRODUCING SAME

FIELD OF TECHNOLOGY

The present invention relates to a polylactic acid foam molding material, a polylactic acid foam molded article, and to a method for manufacturing the foam molded article.

PRIOR ART

Polylactic acid is manufactured from starch, which is a renewable raw material, and because of its biodegradability, is an environmentally friendly resin. Products manufactured from polylactic acid are biodegradable, and thus can be disposed through burial, as compost.

Polystyrene foam molded articles are often used as foodstuff containers or as shock absorbing packing materials, or the like, but because they are not biodegradable, they must be recovered for disposal or recycling.

Patent Document 1, listed below, describes a method for manufacturing a foam molded article through increasing the molecular weight through adding, to polylactic acid, which is effectively amorphous, a polyol such as glycerol, erythritol, or pentaerythritol, or a polycarboxylic acid such as pyromellitic acid, such as trimellitic acid, and cross-linking using a polyisocyanate.

With a polylactic acid alone, it is difficult to produce a stabilized composition with a high melt viscosity that is suitable for foam molding, and thus in order to produce a polylactic acid composition with a stabilized melt viscosity, conditions that satisfy the following equations are needed:

$$(0.5xn-100EM_i)Mc/10NM_i \leq W \leq (0.5xn-100EM_i)M_c/NM_i$$

wherein:

E is the number of terminal carboxyl groups in the polylactic acid (equivalent/gr), x is the amount of isocyanate compound added (percent by weight), n is the number of isocyanate compound functional groups (equivalent/mol), $M_i$ is the molecular weight of the isocyanate compound (gr), W is the amount of polyol or polycarboxylic acid added (percent by weight), N is the number of functional groups of the polyol or polycarboxylic acid (equivalent/mol), and $M_c$ is the molecular weight of the polyol or polycarboxylic acid (gr).

Moreover, the blending quantity of the polyisocyanate should be between 0.3 and 3% by weight, and preferably between 0.7 and 2% by weight. If the polyisocyanate were too little, the molecular weight of the polylactic acid after the reaction would be too low, so that only a foam molded body with a low foam expansion ratio would be produced. On the other hand, if there were too much polyisocyanate, then gellification would occur, preventing the production of a good foam molded body.

The foam molded article is manufactured through conveying pre-formed beads, after impregnation with a foaming agent, into a mold, and heating, with steam, to perform foam molding. The foaming agent may be a hydrocarbon such as propane, n-butane, iso-butane, n-pentane, iso-pentane, neopentane, cyclopentane, hexane, or the like, a halogenated hydrocarbon such as methyl chloride, methylene chloride, dichlorodifluoromethane, or the like, an ether such as dimethyl ether, methyl ethyl ether, or the like, and alcohol with a carbon number between 1 and 4, a ketone, an ether, benzene, toluene, or the like, is used as a foaming auxiliary agent.

Patent Document 2, listed below, explains that, in order to form uniform and fine foam cells, preferably a foam nucleating agent is mixed in, where solid particulates, such as, for example, inorganic particles such as talc, silica, kaolin, zeolite, mica, alumina, and the like, or carbonic acid or bicarbonate, or salts such as alkali metal salts of carboxylic acid, are suitable for the foam nucleating agent that is used.

In a manufacturing method described in Patent Document 1, listed below, wherein a polyol such as glycerol, erythritol, or pentaerythritol, or a polycarboxylic acid such as trimellitic acid, pyromellitic acid, or the like, is added, it is necessary to react polyisocyanate and the polylactic acid in a first stage, and then to add the polyol or polycarboxylic acid in a second stage, and mix and reactive. If the sequence of these reactions were reversed, or if they were reacted simultaneously, gellification would result.

In the manufacturing method described above, there is the need for additional equipment investment in order to add and react the polyol or polycarboxylic acid in the second step, and this also causes the manufacturing process to be longer, and thus is economically disadvantageous.

Moreover, there is also a major drawback in that the thermal durability of the foam molded article is inadequate due to the use of the amorphous polylactic acid.

PRIOR ART DOCUMENTS

Patent Documents

Patent Document 1: Japanese Unexamined Patent Application Publication 2000-169546

Patent Document 2: Japanese Unexamined Patent Application Publication 2000-17039

SUMMARY OF THE INVENTION

Problem Solved by the Present Invention

In the object of the present invention, the problem is to provide, inexpensively, a manufacturing method and apparatus for a polylactic acid foam molding material with stabilized high viscosity, which is suitable in high expansion ratio foam molding, along with a high expansion ratio foam molded article made therefrom.

Means for Solving the Problem

The present invention is a polylactic acid foam molding material made from three types of polylactic acids (A), (B), and (C) having differing structural proportions of D isomers and L isomers, and between 0.2 and 2.0 parts by weight of a cross-linking agent having epoxy groups or polyisocyanate groups, relative to a total of 100 parts by weight for the polylactic acids, wherein no polylactic acid with a polystyrene-equivalent molecular weight of 2,000,000 or more, in a GPC measurement, is included, the weight proportions of the polylactic acids (A):(B):(C) are 25-50:25-50:25-50 (wherein (A)+(B)+(C)=100), and wherein the MI value, measured in accordance with JIS K 7210 at 190° C. and a load of 21.6 kg, is between 0.5 and 5.

Moreover, the present invention is a polylactic acid foam molding material as set forth above, wherein: the structural proportions (D/L) for the D isomers and the L isomers in the polylactic acids (A), (B), and (C), are $D_A/L_A$=5 to 20/95 to 80 (where $D_A+L_A$=100) for the polylactic acid (A), $D_B/L_B$=($D_A$+3 to $D_A$+10)/($L_A$−3 to $L_A$−10) (where $D_B+L_B$=100) for the polylactic acid (B), and $D_C/L_C$=($D_B$+3 to $D_B$+10)/($L_B$−3 to $L_B$−10) (where $D_C+L_C$=100) for the polylactic acid (C).

Moreover, the present invention is a polylactic acid foam molding material as set forth above, wherein: calcium carbonate or talc microparticles are included at between 0.5 and 5 parts by weight.

Moreover, the present invention is a foam molded article made from a polylactic acid foam molding material as set forth above, where this foam molded article may be a molded article that is foam-molded from pre-foamed beads, or a foam molded article that is extrusion molded directly without forming beads.

Moreover, the present invention is a foam molded article as set forth above, wherein a shape is maintained after filling with hot water and 90° C., wherein this foam molded article (foam container) maintains a container shape, without deformation, for three minutes after filling with water at 90° C.

Moreover, the present invention is a method for manufacturing a polylactic acid foam molding material having an MI value, measured in accordance with JIS K 7210 at 190° C. and a load of 21.6 kg, of between 0.5 and 5, including: a step for preparing three types of cross-linked polylactic acids (A), (B), and (C), having differing structural proportions of D isomers and L isomers, obtained by subjecting, to physical or mechanical molecular weight reduction, in the presence of a supercritical inert gas, and recombination, products produced through a cross-linking reaction of 100 parts by weight of polylactic acids structured from D isomers and L isomers and between 0.2 and 2.0 parts by weight of cross-linking agents having epoxy groups or polyisocyanate groups; and a step for mixing the cross-linked polylactic acids (A), (B), and (C) at weight proportions of 25-50:25-50:25-50 (wherein (A)+(B)+(C)=100), and performing physical or mechanical molecular weight reduction, in the presence of a supercritical inert gas, and recombining, on a polylactic acid with a polystyrene-equivalent molecular weight of no less than 2,000,000 in a GPC measurement, produced when melting the mixture.

Moreover, the present invention is a manufacturing method for a polylactic acid foam molding material as set forth above, wherein: the structural proportions (D/L) for the D isomers and the L isomers in the cross-linked polylactic acids (A), (B), and (C), are $D_A/L_A$=5 to 20/95 to 80 (where $D_A+L_A$=100) for the cross-linked polylactic acid (A), $D_B/L_B$=($D_A$+3 to $D_A$+10)/($L_A$−3 to $L_A$−10) (where $D_B+L_B$=100) for the cross-linked polylactic acid (B), and $D_C/L_C$=($D_B$+3 to $D_B$+10)/($L_B$−3 to $L_B$−10) (where $D_C+L_C$=100) for the cross-linked polylactic acid (C).

Moreover, the present invention is a method for manufacturing a polylactic acid foam molding material having an MI value, measured in accordance with JIS K 7210 at 190° C. and a load of 21.6 kg, of between 0.5 and 5, including: a step for mixing three types of polylactic acids (A), (B), and (C), having differing structural proportions of D isomers and L isomers, at weight proportions of 25-50:25-50:25-50 (wherein (A)+(B)+(C)=100); and a step for performing physical or mechanical molecular weight reduction, in the presence of a supercritical inert gas, and recombining, on a polylactic acid with a polystyrene-equivalent molecular weight of no less than 2,000,000 in a GPC measurement, produced through a cross-linking reaction of 100 parts by weight of the polylactic acid mixture from the previous step and between 0.2 and 2.0 parts by weight of a cross-linking agent having epoxy groups or polyisocyanate groups.

Moreover, the present invention is a method for manufacturing a polylactic acid foam molding material as set forth above, wherein: the structural proportions (D/L) for the D isomers and the L isomers in the polylactic acids (A), (B), and (C), are $D_A/L_A$=5 to 20/95 to 80 (where $D_A+L_A$=100) for the polylactic acid (A), $D_B/L_B$=($D_A$+3 to $D_A$+10)/($L_A$−3 to $L_A$−10) (where $D_B+L_B$=100) for the polylactic acid (B), and $D_C/L_C$=($D_B$+3 to $D_B$+10)/($L_B$−3 to $L_B$−10) (where $D_C+L_C$=100) for the polylactic acid (C).

Moreover, the present invention is a method for manufacturing a foam molded article of a polylactic acid foam molding material having an MI value, measured in accordance with JIS K 7210 at 190° C. and a load of 21.6 kg, of between 0.5 and 5, including: a step for preparing three types of cross-linked polylactic acids (A), (B), and (C), having differing structural proportions of D isomers and L isomers, obtained by subjecting, to physical or mechanical molecular weight reduction, in the presence of a supercritical inert gas, and recombination, products produced through a cross-linking reaction of 100 parts by weight of polylactic acids structured from D isomers and L isomers and between 0.2 and 2.0 parts by weight of cross-linking agents having epoxy groups or polyisocyanate groups; and a step for performing foam molding by discharging, at a temperature that is no less than a softening point and no greater than 110° C., a polylactic acid foam molding material produced through mixing the cross-linked polylactic acids (A), (B), and (C) at weight proportions of 25-50:25-50:25-50 (wherein (A)+(B)+(C)=100), and performing physical or mechanical molecular weight reduction, in the presence of a supercritical inert gas, and recombining, on a polylactic acid with a polystyrene-equivalent molecular weight of no less than 2,000,000 in a GPC measurement, produced when melting the mixture.

Moreover, the present invention is a method for manufacturing a foam molded article of a polylactic acid foam molding material as set forth above, wherein: calcium carbonate or talc microparticles are included at between 0.5 and 5 parts by weight in respect to 100 parts by weight of the mixture.

Moreover, the present invention is a method for manufacturing a foam molded article of a polylactic acid foam molding material having an MI value, measured in accordance with JIS K 7210 at 190° C. and a load of 21.6 kg, of between 0.05 and 5, including: a step for mixing three types of polylactic acids (A), (B), and (C), having differing structural proportions of D isomers and L isomers, at weight proportions of 25-50:25-50:25-50 (wherein (A)+(B)+(C)=100); and a step for performing foam molding by discharging, at a temperature that is no less than a softening point and no greater than 110° C., a polylactic acid foam molding material formed through performing physical or mechanical molecular weight reduction, in the presence of a supercritical inert gas, and recombining, on a polylactic acid with a polystyrene-equivalent molecular weight of no less than 2,000,000 in a GPC measurement, produced through a cross-linking reaction of 100 parts by weight of the polylactic acid mixture from the previous step and between 0.2 and 2.0 parts by weight of a cross-linking agent having epoxy groups or polyisocyanate groups.

Moreover, the present invention is a method for manufacturing a foam molded article of a polylactic acid foam molding material as set forth above, wherein: calcium carbonate or talc microparticles are included at between 0.5 and 5 parts by weight in respect to 100 parts by weight of the polylactic acid mixture.

Moreover, the present invention is a foam molded article manufactured using a manufacturing method for a foam molded article of a polylactic acid foam molding material as set forth Moreover, the present invention is a foam molded article as set forth above, wherein a shape is maintained after filling with hot water at 90° C.

Effects of the Invention

The polylactic acid foam molding material according to the present invention enables the foam cell film to be made thinner due to the absence of gellified parts and of polylactic acid parts with remarkably high molecular weights, which would be impeding factors when performing a high expansion ratio molding, thus enabling stabilized and inexpensive supply of high expansion ratio foam molded articles. Moreover, the foam molded article of the present invention, which uses a stabilized high melt viscosity polylactic acid foam molding material wherein no polyol or polycarboxylic acid has been added, is a foam molded article sheet and container that can, in practice, withstand hot water.

BRIEF DESCRIPTIONS OF THE DRAWINGS

FORMS FOR CARRYING OUT THE PRESENT INVENTION

Figure 1:
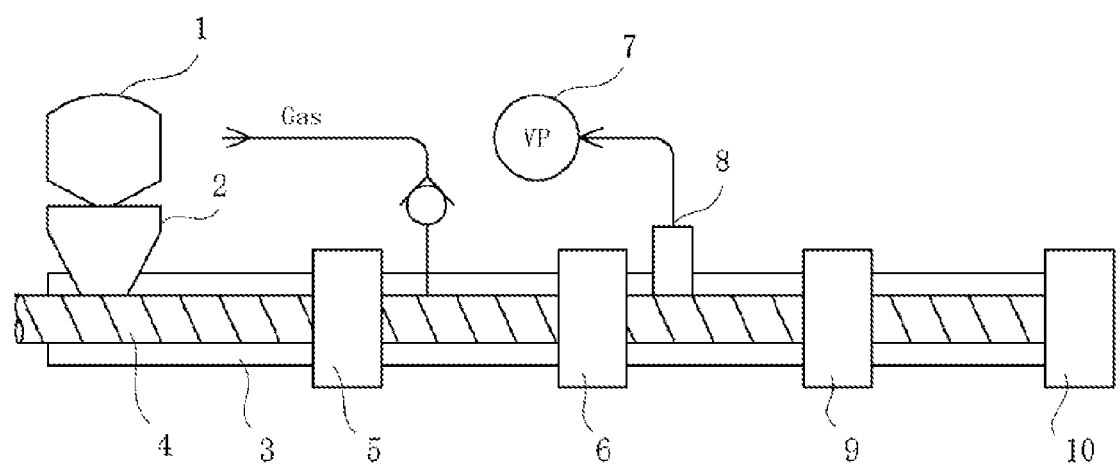
FIG. 1 is a diagram depicting the structure in a preferred example of a reaction extruder used in the manufacturing method according to the present invention.

In lactic acid dimers that are ring-opening polymerized monomers of polylactic acid, there are L isomers and D isomers, which are racemates, and polylactic acids are manufactured having various different D isomer and L isomer compositions depending on the mixing proportions thereof.

When manufacturing the polylactic acid foam molding material according to the present invention, polylactic acids with remarkably high molecular weights (polystyrene-equivalent molecular weights of 2,000,000 or more, measured through GPC), generated through the use of three types of cross-linked polylactic acids (A), (B), and (C), that have different structural proportions of the D isomers and the L isomers are used, where, in all of these cross-linked polylactic acids, 0.5 parts by weight of tin octylate is added, as a catalyst, to 100 parts by weight of the mixture of D lactides and the L lactides, where polymers with number-average molecular weights of no less than 5,000, obtained through ring-opening polymerization, are used as a raw material, and between 0.2 and 2.0 parts by weight of a cross-linking agent having epoxy groups or polyisocyanate groups is added to 100 parts by weight of this polylactic acid raw material, and melted, are subjected to physical molecular weight reduction in the presence of a supercritical inert gas, and subjected to mechanical pulverization through the application of a shearing force. Moreover, these three types of cross-linked polylactic acids, manufactured as described above, are mixed in prescribed weight proportions, and the mixture is supplied to an injection molding machine or extrusion molding machine that is equipped with a grinding orifice, so that the polylactic acids with remarkably high molecular weights, produced when melting, are subjected to physical or mechanical molecular weight reduction and are recombining to manufacture the polylactic acid foam molding material according to the present invention. The cross-linked polylactic acids (A), (B), and (C) used at this time have structural proportions (D/L) for the D isomers and the L isomers as described below.

In the present invention, preferably the cross-linked polylactic acid (A) wherein the proportion of the D isomer is the smallest has a structural proportion ($D_A/L_A$) of between 5 and 20 parts by weight/between 95 and 80 parts by weight (wherein $D_A$ plus $L_A$=100 parts by weight), where, in respect to this cross-linked polylactic acid (A), the D isomer proportion in the cross-linked polylactic acid (B) is between 3 and 10 parts by weight greater than the D isomer proportion in the cross-linked polylactic acid (A), and, conversely, the L isomer proportion is between 3 and 10 parts by weight less than L isomer proportion in the cross-linked polylactic acid (A). Moreover, the proportion of the D isomer in the cross-linked polylactic acid (C) is between 3 and 10 parts by weight greater than the proportion of the D isomer in the cross-linked polylactic acid (B), and, conversely, the proportion of the L isomer is between 3 and 10 parts by weight less than the proportion of the L isomer in the cross-linked polylactic acid (B). As specific structural proportions (weight proportions) for the D isomers and the L isomers in the three types of cross-linked polylactic acids (A), (B), and (C) they may be, for example, $D_A/L_A$=7/93 for the cross-linked polylactic acid (A), $D_B/L_B$=10/90 for the cross-linked polylactic acid (B), and $D_C/L_C$=13/87 for the cross-linked polylactic acid (C), or $D_A/L_A$=10/90 for the cross-linked polylactic acid (A), $D_B/L_B$=20/80 for the cross-linked polylactic acid (B), and $D_C/L_C$=30/70 for the cross-linked polylactic acid (C), or $D_A/L_A$=20/80 for the cross-linked polylactic acid (A), $D_B/L_B$=30/70 for the cross-linked polylactic acid (B), and $D_C/L_C$=40/60 for the cross-linked polylactic acid (C), but there is no limitation thereto.

Figure 3:
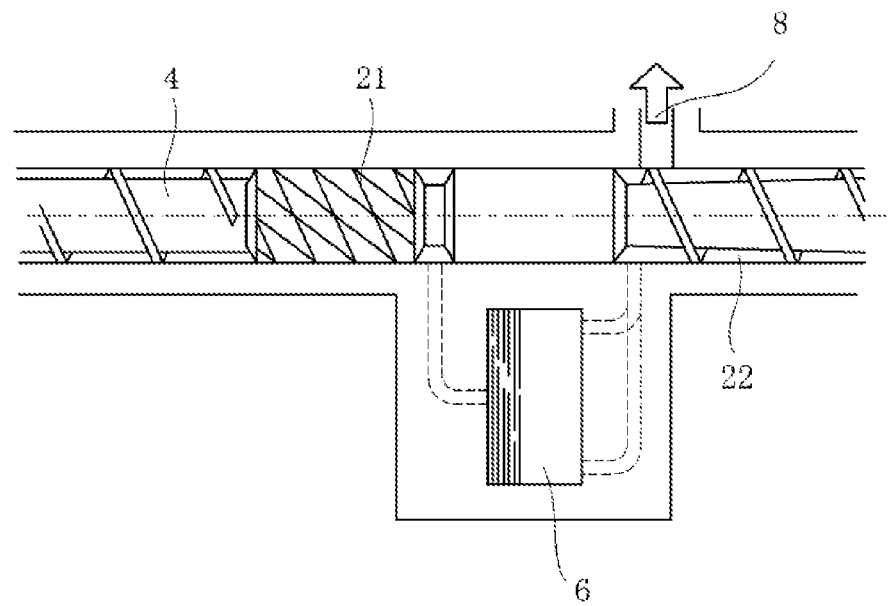
FIG. 3 is a diagram illustrating the internal structure in a preferred example of an orifice portion of the reaction extruder depicted in FIG. 1.

Because the polylactic acid is a condensation polymer, the molecular weight will vary with the equilibrium water content. Despite being a high molecular weight polylactic acid, when melted after moisture absorption, a sudden molecular weight reduction will occur, reducing the molecular weight to the equilibrium molecular weight that matches the water content. In the present invention, the provision of a think viscosity portion 21, an orifice portion 6, and a pressure reducing/extending portion 22, as depicted in FIG. 3, enables prevention of molecular weight reduction of the polylactic acid through re-melting when the water content is excessively high.

The polylactic acid used in the present invention may be either a crystalline polylactic acid or an amorphous polylactic acid. In the case of pre-foamed beads that are impregnated with a forming agent, an amorphous polylactic acid wherein the D isomers and L isomers are copolymerized is used. In the case of extrusion foam molding, crystalline polylactic acid is preferred, as it improves thermal durability. Moreover, a complex polylactic acid, wherein D isomers and L isomers are mixed, is preferred, as it further improves thermal durability.

Preferably the number-average molecular weight of the polylactic acid prior to cross-linking using the polyisocyanate is no less than 5,000, and more preferably no less that 20,000, and even more preferably no less than 100,000. The lower the molecular weight of the polylactic acid, the greater the quantity of the cross-linking agent, such as polyisocyanate, required to produce the reaction in order to obtain the viscosity required for high foam expansion ratio molding, which is economically disadvantageous.

The polylactic acid, prior to carrying out cross-linking, is dried in advance through an established method, such as vacuum drying, to control the water content ratio. Preferably the water content ratio of the polylactic acid prior to cross-linking is no greater than 500 ppm, and more preferably no greater than 100 ppm. Even more preferably, it is no greater than 50 ppm. Polyisocyanate reacts with water to produce carbon dioxide gas, which becomes inactive, and thus has an adverse effect on the efficiency of the polyisocyanate. It is economically disadvantageous when the water content ratio of the polylactic acid prior to cross-linking is too great.

The polyisocyanate used in the present invention is a polyisocyanate that is a diisocyanate or above, and preferably is a triisocyanate or a tetraisocyanate, or includes a diisocyanate adduct. When a polyisocyanate that is a triisocyanate or above is used, branching is produced in the polylactic acid polymer chain, which ensures a strong film, thus enabling an improved foam expansion ratio.

In the present invention, the polyisocyanate used for the cross-linking reaction should be an isocyanate compound that has no less than two isocyanate bases in the molecule. The polyisocyanate may be, for example, an aliphatic diisocyanate such as 1,6-hexamethylene diisocyanate, 3-isocyanatomethyl-3,5,5-trimethylcyclohexyl isocyanate (isophorone diisocyanate), 1,4-tetramethylene diisocyanate, 2,4,4-trimethylhexamethylene diisocyanate, 2,2,4-trimethylhexamethylene diisocyanate, dicyclohexylmethane-4,4'-diisocyanate, methylcyclohexyl-2,4-diisocyanate, methylcyclohexyl-2,6-diisocyanate, xylylene diisocyanate, 1,3-bis (isocyanate) methylcyclohexane, tetramethylxylylene diisocyanate, transcyclohexane-1,4-diisocyanate, lysine diisocyanate, or the like; an alicyclic polyisocyanate such as isophorone diisocyanate, hydrogenated diphenylmethane diisocyanate, hydrogenated tolylene diisocyanate, hydrogenated xylylene diisocyanate, hydrogenated tetramethylxylylene diisocyanate, cyclohexane diisocyanate, or the like; an aromatic diisocyanate such as 2,4-toluylene diisocyanate, 2,6-toluylene diisocyanate, diphenylmethane-4,4'-isocyanate, 1,5'-naphthene diisocyanate, tolidine diisocyanate, diphenylmethylmethane diisocyanate, tetraalkyl diphenylmethane diisocyanate, 4,4'-dibenzyl diisocyanate, 1,3-phenylene diisocyanate, or the like; a triisocyanate compound such as lysine ester triisocyanate, triphenylmethane triisocyanate, 1,6,11-undecane triisocyanate, 1,8-isocyanate-4,4-isocyanatomethyloctane, 1,3,6-hexamethylene triisocyanate, bicycloheptane triisocyanate, an adduct of trimethylolpropane and 2,4-toluylene diisocyanate, an adduct of trimethylolpropane and a diisocyanate such as 1,6-hexamethylene diisocyanate, or the like; or a modified polyisocyanate compound obtained by reacting a polyisocyanate compound such as glycerin or pentaerythritol with and aliphatic or aromatic diisocyanate compound described above or a triisocyanate compound described above, and so forth. These may be used either singly, or in mixtures of two or more thereof. Moreover, in the present invention, acrylic cross-linking agents that have epoxy groups may be used instead of the isocyanates listed above.

Using a polyisocyanate that is a triisocyanate or above, for the polyisocyanate, produces branching in the polylactic acid molecular chain, which is preferred because it increases the foam cell film strength. This phenomenon is the same as in the case of forming a film from polyethylene, wherein a low-density polyethylene, wherein there are branches in the polymer chain, is used instead of a high-density polyethylene, which is of a straight-chain type.

The blending quantity for the polyisocyanate will vary depending on the molecular weight of the polylactic acid prior to cross-linking. Moreover, it will vary depending on the molecular weight distribution of the polylactic acid as well. The greater the amount of low molecular weight polylactic acid, the higher the blending quantity that is required in order to obtain a melt viscosity that is suitable for forming. The blending quantity of the polyisocyanate preferably is between 0.2 parts by weight and 2 parts by weight, relative to 100 parts by weight of the polylactic acid mixture prior to cross-linking. If the blending quantity of the polyisocyanate were too low, the foam expansion ratio would be reduced, because it would not be possible to obtain a melt viscosity that is suitable for forming. If too high, gellification would result, reducing the foam expansion ratio.

Note that when the cross-linked PLA is manufactured using an extruder after stirring and mixing the polylactic acid in the form of pellets and a liquid cross-linking agent, extremely large molecular blocks are mixed and generated, caused by imbalanced dispersion. It has been discovered that if this cross-linked PLA were processed into a film using an inflation machine, the extremely large molecular blocks would protrude at various places in the flat film, which would interfere with subsequent processing.

As a physical method for solving this, some of the chains of the cross-linked portion can be broken more quickly and easily when in a nitrogen gas or carbon dioxide gas supercritical state, the more extremely large the molecule, and, conversely, if not an extremely large molecule, there is a tendency to undergo molecular weight reduction gradually. Moreover, when released from a nozzle, in a superfluid state, into a no-pressure release space that is placed under vacuum by a vacuum pump, the molecules immediately cross-link and combine with other groups of molecules, so that the molecular weights of the cross-linked PLAs will be closer to the average than before. Moreover, through having the nozzle be structured from long slits (FIG. 4), the extremely large molecules are also pulverized mechanically as well. Note that the retention time required prior to passing through the slits, from the supercritical state, in the extruder is no more than about two minutes, and there is essentially no reduction in molecular weight of pure PLA. Moreover, the volume of the gas is extremely compressed up until arriving at Out of the slits (FIG. 4), and the calorific value of the gas is extremely trivial, and thus, when released into the no-pressure release space, the gas expands rapidly and is degassed, producing adiabatic expansion wherein the heat lost is extremely negligible. Moreover, the cross-linking reaction of the small remaining non-reacted portion is completed within the time prior to cutting by the submerged cutting in the back stage.

Figure 5:
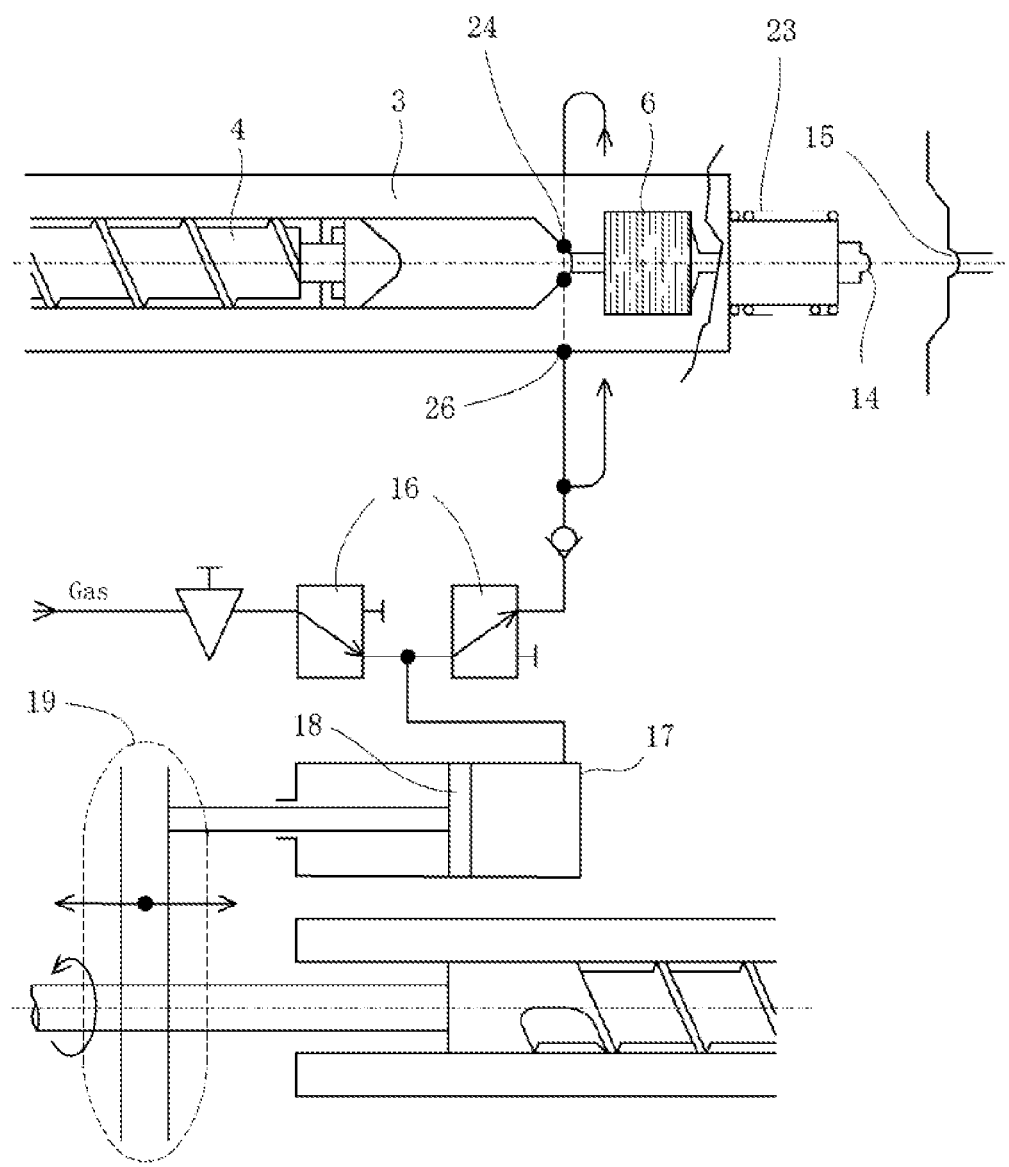
FIG. 5 is a diagram depicting the structure in a preferred example of a PLA foam injection molding machine used in the manufacturing method according to the present invention.
Figure 8:
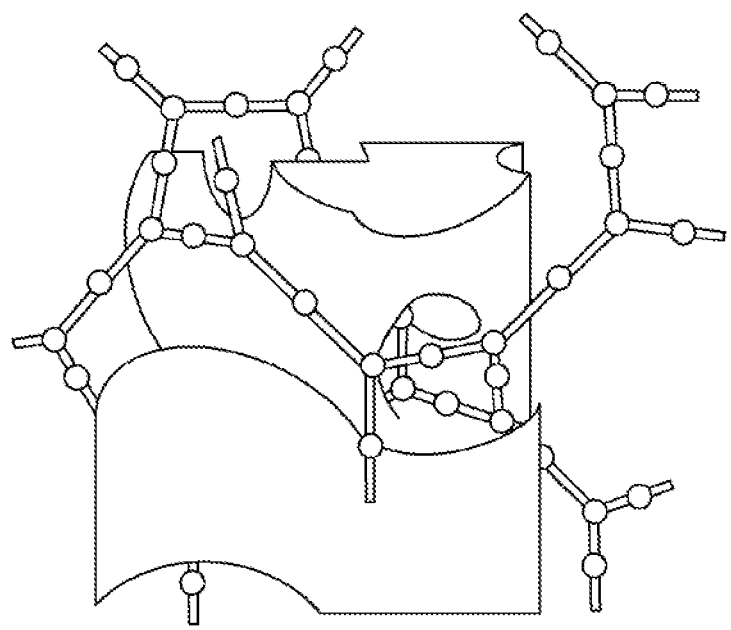
FIG. 8 is a schematic diagram illustrating an example of a case wherein the combining is more complex when recombining after physical molecular weight reduction and mechanical crushing.

The cross-linking locations, pulverized by the orifice portion, recombined in the no-pressure release space region (FIG. 3), which is drawn to a vacuum through the vent hole, or at or after the nozzle in the injection molding machine (FIG. 5). Note that the pressure at and after the nozzle in the case of an injection molding machine corresponds to the pressure within the mold. In this recombination, there are many opportunities for combining into complex structures such as, for example, depicted in FIG. 8, where such complex combinations have the effect of further increasing the viscosity. Note that the greater the number of times, such as twice or three times, that there is pulverization by the orifice portion and recombination in the no-pressure release space, the more complex the combination, but in practice, even once is enough.

Moreover, when manufacturing the polylactic acid foam molding material according to the present invention, the three types of cross-linked polylactic acid (A), (B), and (C), described above, are mixed to produce weight proportions of 25-50:25-50:25-50 (where the proportions of the individual polylactic acids are all no greater than 50% by weight, and (A)+(B)+(C)=100), and the polylactic acids with polystyrene-equivalent molecular weights of 2,000,000 or more in a GPC measurement, generated when melted, are subjected to physical molecular weight reduction in the presence of supercritical nitrogen or carbon dioxide gas, and mechanical pulverization through the application of shearing forces.

Moreover, in the present invention, after mixing of the three types of polylactic acids, prior to cross-linking, so as to produce weight proportions of 25-50:25-50:25-50 (where the proportions are no greater than 50% by weight for any of the polylactic acids, and (A)+(B)+(C)=100%) the polyisocyanate may be added to produce cross-linking, and the polylactic acids with polystyrene-equivalent molecular weights of 2,000,000 or more in a GPC measurement, generated when melted, may be subjected to physical molecular weight reduction in the presence of supercritical nitrogen or carbon dioxide gas, and mechanical pulverization through the application of shearing forces.

The MI value of the polylactic acid foam molding material according the present invention, measured in accordance with JIS K 7210 at 190° C. and a load of 21.6 kg, is between 0.05 and 5.

Figure 7:
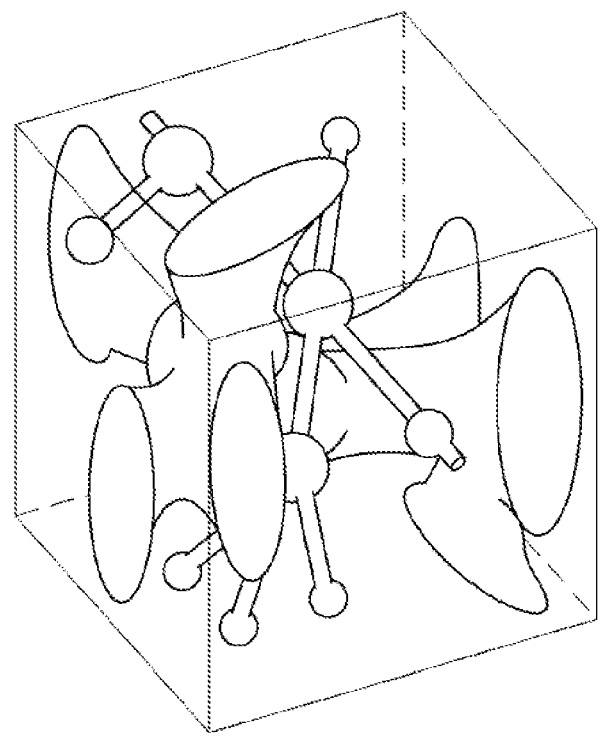
FIG. 7 is a schematic diagram of a three-dimensional parallel structure (a structure such as a gyroid) that appears when polylactic acids of differing structural proportions of D isomers and L isomers are used.

When the three types of polylactic acids, described above, that each have D isomer and L isomer mixing proportions that differ by at least 3% by weight are mixed, melted, and kneaded, polylactic acid aggregates having three-dimensional parallel structures, such as the gyroid structure depicted in FIG. 7 appear, producing a thermodynamically metastable state, and a viscosity of the melted material such that this metastable structure is maintained becomes apparent, which is significantly higher than the viscosity of a single composition. However, when the structural proportions of the D isomers/L isomers in the individual polylactic acids, and the differences between the individual D isomer/L isomer structural proportions, between the three types of polylactic acid, and the mixing proportions for the three types of polylactic acid, were too not all satisfy each of the conditions set forth above, three-dimensional parallel structures such as the gyroid structure would not appear, and there would be no increase in the apparent viscosity.

In the case of the polylactic acid foam molding material according to the present invention, the use of the three types of polylactic acids (A), (B), and (C), having different D isomer/L isomer structural proportions, and the mixing of the polylactic acids (A), (B), and (C) in mixing proportions of 25-50:25-50:5-50 causes the appearance of a three-dimensional metastable state structure, thereby increasing the melt viscosity by a factor of about 10 times or more when compared to the case of a single composition. Moreover, in the present invention it is possible to obtain a stabilized foam cell film wherein the molecular weights of remarkably large polymers have been reduced through suppressing the production of remarkably large polymers through reducing the blending quantity of the cross-linking agent, and also through physically reducing the molecular weight, under inert gas supercritical conditions, of any remarkably large polymers produced through nonuniform reactions with the isocyanate or epoxy groups described above, and through averaging through mechanical pulverization.

Because isocyanates are highly reactive, they react with low-molecular-weight polyols and polycarboxylic acids, to produce gel compounds. A reaction with a polymer is a reaction with a terminal group, and thus if there is not too much isocyanate, the reaction will not arrive at the production of a gellified mesh structure. However, despite not producing all the way to an extremely large mesh structure that becomes insoluble, still a nonuniform reaction is produced, generating polymers with remarkably high molecular weights. When there exist some polymers with a polystyrene-equivalent molecular weight of 2,000,000 or more in a GPC measurement, uneven stretching of the foam cell film would be the result, making it difficult to produce a high expansion ratio foam. More preferably, the composition is one that does not include polymers having a polystyrene-equivalent molecular weight greater than 1,500,000.

The thermal durability is inversely proportional to the ease of movement of the molecule. The greater the molecular weight, the greater the thermal durability. While liquid paraffin is a liquid at room temperature, paraffin wherein the molecular weight is slightly higher is a solid at room temperature. Moreover, polyethylene, wherein the molecular weight is high, has a melting point of about 130° C., and a polyethylene with a super high molecular weight will have a melting point that is increased up to 150° C.

In the method for manufacturing the polylactic acid foam molding material according to the present invention, after the molecular weight of the polylactic acid foam molding material is increased through the coupling reaction by the polylactic acid and the polyisocyanate or epoxy groups, it is necessary have a step to either reduce the molecular weight under inert gas supercritical conditions, or to apply a large shearing force mechanically to pulverize the remarkably large polylactic acid molecules. If this step were not present, then the remarkably large polylactic acid molecules would interfere with the expansion of the foam cell film locally, making it impossible to produce a high expansion ratio foam molded article.

The inert gas that does not react with the polylactic acid, as referenced in the present invention, may be, for example, nitrogen gas, carbon dioxide gas, helium gas, argon gas, methane gas, ethane gas, propane gas, butane gas, ethylene gas, propylene gas, or the like. Of these, nitrogen gas and carbon dioxide gas are preferred due to ease in achieving the supercritical conditions, low cost, and non-flammability, and these gases may be used together. The supercritical point for nitrogen gas is (−147° C., 3.39 MPa), for carbon dioxide gas is (31.1° C., 7.38 MPa), and for methane gas is (−83° C., 4.6 MPa). For ethylene gas, it is (32.4° C., 4.88 MPa), for propane gas it is (93.8° C., 4.25 MPa), and for butane gas is (152° C., 3.380 MPa).

When manufacturing beads, the inert gas is supplied at a constant rate so as to mix in at between 0.1 and 2% by weight relative to the polylactic acid, but is recovered and reused after trapping of the water content. The inert gas is replenished in the processing machine system of the present invention only in the amount that is actually lost. In the case of direct injection foam molding, the inert gas is used as the foaming gas, and thus a large amount is used. However, when the foaming mold of the present invention, which has a variable thickness hollow portion at a constant temperature (referencing FIG. 6) is used, the forming efficiency of the inert gas used in forming is no different from that of a bead foam, and thus is supplied at a constant rate so as to be mixed in at between 0.1 and 2% by weight relative to the polylactic acid.

A typical method for pressurizing to a pressure that is at least that of the supercritical point, for example, a pressurizing apparatus such as a plunger pump, a gear pump, a screw, or the like, and for heating to a temperature that is at least that of the supercritical point, there are heating apparatuses such as casting heaters, jacket heaters, and the like.

While the melting point for the polylactic acid will vary depending on the degree of polymerization, it is no greater than roughly 170° C. In the present invention, the polylactic acid prior to cross-linking is reacted with the polyisocyanate or epoxy groups at no less than the melting point of the polylactic acid. In the present invention, the polyisocyanate, which is not a liquid at room temperature, is melted and is added quantitatively, using a plunger pump, or the like, to the polylactic acid that is in a semi-melted state, to react with the polylactic acid. When a high viscosity reactive substance is mixed with a low viscosity compound, it can be anticipated that there will be a more uniform reaction, through dispersing well in advance, when the high viscosity substance is mixed in a semi-melted state, at a low temperature.

Other biodegradable polymers may be mixed into the polylactic acid foam molding material according to the present invention in a range that has no remarkable deleterious effect on the physical properties of the foam molded article. As other biodegradable polymers there are, for example, polycaprolactam, polybutylene succinate, polyhydroxybutyrate, poly(hydroxybutyrate/hydroxyhexanoate), poly (polylactic acid/polybutylene succinate type) block copolymers, poly(caprolactone/butylene succinate), poly (butylene succinate/adipate), poly(butylene succinate/carbonate), poly(ethylene terephthalate/succinate), poly(butylene adipate/terephthalate), poly(tetramethylene adipate/terephthalate), and the like.

Preferably a foam nucleating agent is mixed in, in order to form uniform fine foam cells. The form nucleating agent may be, for example, inorganic particles such as talc, silica, kaolin, zeolite, mica, alumina, or the like, a carbonic acids or bicarbonates, such as calcium carbonate, alkali metal salts such as carboxylic acid, and so forth. Of these, calcium carbonate and talc are soft, and fine particles thereof can be obtained inexpensively, and thus are preferred. Because the foam cell film thickness will be thin in a high expansion ratio foam, a particle size of no greater than 1 μm is preferred for the form nucleating agent, and 0.5 μm is even more preferred. The blending quantity for the form nucleating agent is preferably between 0.5 and 5% by weight relative to the polylactic acid foam molding material, were between 0.5 and 2% by weight is particularly preferred. If the blending quantity for the form nucleating agent were too small, there would be a tendency for the sizes of the cells to be nonuniform, and if too great, it would be difficult to achieve a high foam expansion ratio.

The form nucleating agent may be mixed in when manufacturing the cross-linked polylactic acids (A), (B), and (C), described above, or may be mixed into the polylactic acid foam molding material according to the present invention at the time of foam molding.

In the present invention, a forming inert gas, such as nitrogen gas, or the like, is a side injected into the polylactic acid foam molding material according to the present invention, in a melted state, to cause foaming. At this time, molding the foam under high-temperature and high-pressure conditions that are no less than the supercritical point, or subcritical, for the forming inert gas, such as nitrogen gas, is preferred because it enables a foam molded article with fine cells. Instead of nitrogen gas as an inert foaming gas, the foaming agent may be, for example, a hydrocarbon such as propane, n-butane, isobutane, n-pentane, isopentane, neopentane, cyclopentene, hexane, butane, or the like, a hydrocarbon halide such as methyl chloride, methylene chloride, dichlorodifluoromethane, or the like, an ether such as dimethyl ether, methyl ethyl ether, or the like, and so forth. Alcohols with carbon numbers between 1 and 4, ketones, ethers, benzene, toluene, and the like, are used as foaming auxiliary agents. These foaming agents may be mixed for use.

That which is generally used, such as for example, pigments, flame retardants, deodorizing agents, stabilizing agents, anti-fungal agents, anti-mildew agents, and other additives, may be used, in a range that does not effect the biodegradability or quality of the foam molded article, in the molded article that is manufactured using the polylactic acid foam molding material according to the present invention. Moreover, in the present invention a powder of a vegetable fiber, for example, paper powder, bamboo powder, or the like, can be added at between 0.2 and 2.0 parts by weight, relative to 100 parts by weight of the cross-linked polylactic acids (A)+(B)+(C) to improved remarkably the strain of the molded article shape, such as warping immediately after molding, warping due to moisture, temperature, uneven wall pressure, or the like, warping due to direct sunlight, and so forth, without sacrificing the other foam characteristics.

The functional structures of the various portions in a preferred example of a reaction extruder that is used in the manufacturing method according to the present invention will be explained next. In the reaction extruder illustrated in FIG. 1, a measured polylactic acid (PLA) and cross-linking agent were loaded into a Henschel mixer 1 and stirred and mixed, and supplied to a hopper 2. Following this, the PLA was completely melted, by a heated cylinder 3 and a screw 4, prior to arrival from the hopper 2 to a front stage gear pump 5, to produce a polylactic acid with a polystyrene-equivalent molecular weight of 2,000,000, or more, in a GPC measurement. At this time, the PLA melt in excess of the feeding capacity of the front stage gear pump 5 slips in the screw 4, so that no excess is supplied.

Thereafter, at the outlet of the front stage gear pump 5, the supercritical gas is injected with a controlled flow rate. The amount of flow per unit time into the PLA melt at this time is controlled to be constant, through controlling the speed of rotation of the driving servo motor of the front stage gear pump 5. Following this, the PLA melt is caused to pass through the slits of the orifice portion 6 together with the supercritical gas in a superfluid state, where here a shearing force is applied, so that the polylactic acid with a molecular weight of 2,000,000 or more is subjected to physical molecular weight reduction and, simultaneously, to mechanical pulverization. Additionally, the polylactic acid that has been subjected to physical molecular weight reduction and to mechanical pulverization, is released into a no-pressure release the space of a vent hole 8 portion from which the gas was separated and drawn out by a vacuum pump 7, to be caused, by a screw, to arrive at the inlet of a back stage gear pump portion.

Finally, because it is difficult to secure, through a screw alone, the pressure required for passing the PLA melt through the dice of the submerged cutter 10, a back stage gear pump portion 9 is provided at this part for this purpose.

The gas is in a near-vacuum state, having been drawn in advance through the vent hole 8, and, for the purposes of preventing "vent up" of the PLA melt, the speed of rotation of the back stage gear pump portion 9 is set so as to be slightly larger than for the actual feeding rate. The PLA melt that has passed through the dice is cut by a cutter while being cooled with water, to produce solid pellets.

Note that the reaction extruder having the structures described above is used not just when manufacturing the cross-linked polylactic acids (A), (B), and (C) that are used as raw materials, but also is used when manufacturing the polylactic acid foam molding material according to the present invention from the mixture of the cross-linked polylactic acids (A), (B), and (C).

When molding test pieces using pellets produced using the reaction extruder having the structure illustrated in FIG. 1, there was a tendency to have a reduction in dimensions of about 2%, where this phenomenon is believed to be due to a small amount of residual gas within the pellets.

In the reaction extruder in FIG. 1, unlike for the front stage gear pump portion 5, no supercritical gas filling hole is provided in the back stage gear pump portion 9, but it is possible to inject supercritical gas to produce gas-filled foam-unit pellets in this part as well.

While fundamentally pellet-shaped cross-linked polylactic acids PLA (A), PLA (B), and PLA (C) are each manufactured individually, it was confirmed that there is less opportunity for the appearance of three-dimensional parallel structures when manufacturing through simultaneously loading, into the Henschel mixer, the PLA (A), PLA (B), and PLA (C), prior to cross-linking, together with the cross-linking agent, and stirring.

Figure 2:
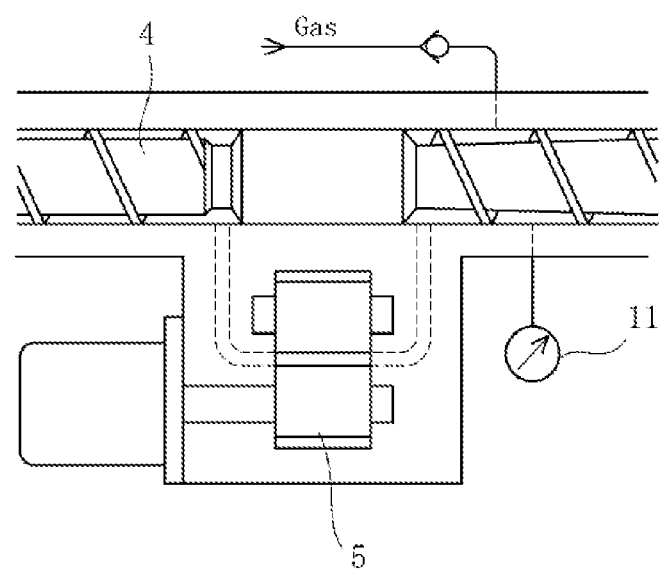
FIG. 2 is a diagram depicting the internal structure in a preferred example of a gear pump portion of the reaction extruder depicted in FIG. 1.

The front stage gear pump portion 5 and the back stage gear pump portion 9 in the reaction extruder having the structure illustrated in FIG. 1, have internal structures as illustrated in FIG. 2, where the flow rates of the PLA melts are adjusted through controlling the speed of rotation of the gears. In the present invention, while a typical well-known gear pump that is commercially available can be used, the gear pump may be disposed separately, on the screw axis, as illustrated in FIG. 2, in a structure that has a single screw 4 that passes through the entire extruder. Given this, when a leak countermeasure is necessary, a structure may be employed wherein a seal can be packed without providing a groove in the applicable part of the screw, in order to direct the route of the PLA melt (indicated by the dotted line) to the gear pump side. Note that the supercritical gas, with the flow rate controlled, is injected from a gas supplying portion on the outlet side of the front stage gear pump portion 5, and the pressure of the PLA melt is measured by a resin pressure gauge 11.

As a specific example of structural dimensions of the thick viscosity portion 21 illustrated in FIG. 3, the screw diameter may be 50 mm and the length of the thick viscosity portion may be 100 mm, where two types of leads are combined in a groove-shaped 2R semicircle. The leads of one type are eight ridges of 50 mm, and the leads of the other type are eight ridges of 150 mm. The common well-known Dulmage screw has a shape that is called a "pineapple," where the leads of one type are disposed in the direction in which the resin melt flows, and the leads of the other type are disposed in the direction opposite from the flow of the resin melt, where, at this part, there is a major shortcoming in that heat is produced. Here the viscosity thickening effect will be about the same in the different leads because both leads are disposed in the same direction as the direction of the flow of the PLA melt, and the amount of heat produced is small, preventing degradation of the resin melt due to heating.

The orifice portion 6 in the reaction extruder having the structure in FIG. 1 has an internal structure such as depicted in FIG. 3, where the structure of the screw 4 of the orifice portion 6 is the same for the front stage gear pump portion 5 and the back stage gear pump portion 9. A vent hole 8 is provided on the cylinder at the outlet side of the orifice portion 6, and is placed under vacuum by a vacuum pump, to structure a no-pressure release space. Note that the layered structure of the slitted plates 12 and the dividing plates 13, disposed in the orifice portion 6, is depicted in FIG. 4.

Figure 4:
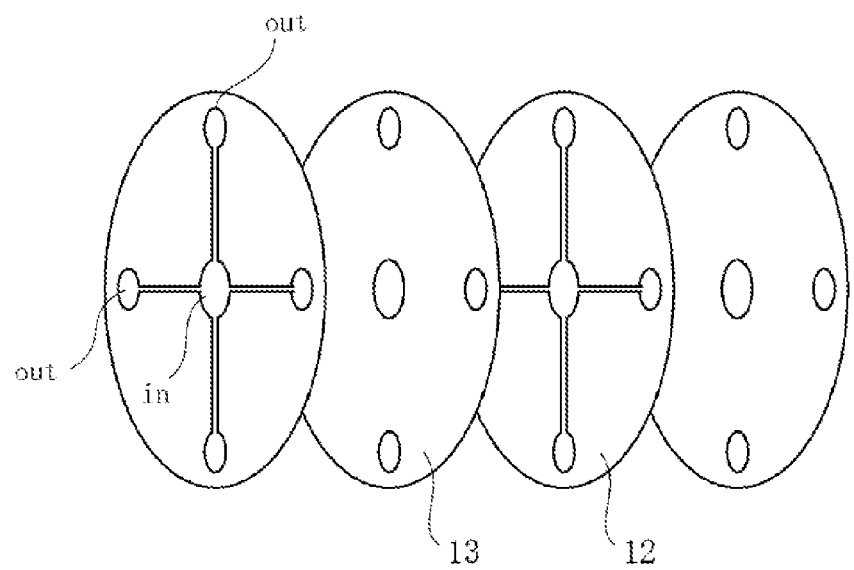
FIG. 4 is a diagram depicting the structure in a preferred example of the orifice depicted in FIG. 3, showing that dividing plates and slitted plates are layered alternatingly.

The structure of the orifice of the orifice portion 6, illustrated in FIG. 3, is depicted in FIG. 4, structured through alternating a plurality (preferably several dozen, for example, between 20 and 50, and preferably between 20 and 40) layers of slitted plates 12 and dividing plates 13. For the preferred dimensions in the present invention, the thickness of the dividing plate 13 is 1 mm, the thickness of the slitted plates 12 is 0.2 mm, the groove width of the slits provided in the slitted plate 12 is 2 mm, and the length of the slits is 35 mm. In the layered structural unit depicted in FIG. 4, the PLA melt is passed, together with the supercritical gas, from the center portion In, to flow moving to the outer peripheral portion Out side.

In the present invention, in order to produce a large shearing force, the polylactic acid foam molding material, at a supercritical or subcritical state, is passed, at a high speed, through a grinding orifice portion made from four slits that extend in four directions, for example, as illustrated in FIG. 4.

The structure in a preferred example of a PLA foam injection molding machine used in the manufacturing method according to the present invention is depicted in FIG. 5, where, in the present invention, the tip end portion of a typical known injection molding machine can be used for the PLA foam injection molding machine through structuring as in FIG. 5. Reference symbol 23 FIG. 5 is a cooling adapter for cooling to an appropriate temperature of no greater than 100° C. prior to injection into the mold, where reference symbol 14 is a shutoff nozzle and reference symbol 15 is a mold filling hole.

The supercritical gas that is supplied into the cylinder 3 is injected through opening an electromagnetic valve 16, synchronized with the timing of the extrusion cycle of the piston. At this time, the provision of gas filling holes in at least two locations is preferred, as this can produce a more uniform foam article. The foam expansion ratio of the PLA resin is inversely proportional to the volume of the PLA melt that is injected into the mold. As one example of a method for setting the pressure of the supercritical gas, although this causes the injection time to be longer, the setting is adjusted and locked-in so as to increase the pressure if the strain is concave after the molded article has been cooled at the time of a test shot, and so as to decrease the pressure if the strain is convex.

As a method that is able to shorten the injection time, the stroke of a piston 18 that is provided within an air cylinder 70 is controlled mechanically, by a movable portion 19, where supercritical gas is filled into the air cylinder when the piston 18 is drawn in, and is expelled into the PLA melt at the time of the expulsion cycle of the piston 18.

Figure 6:
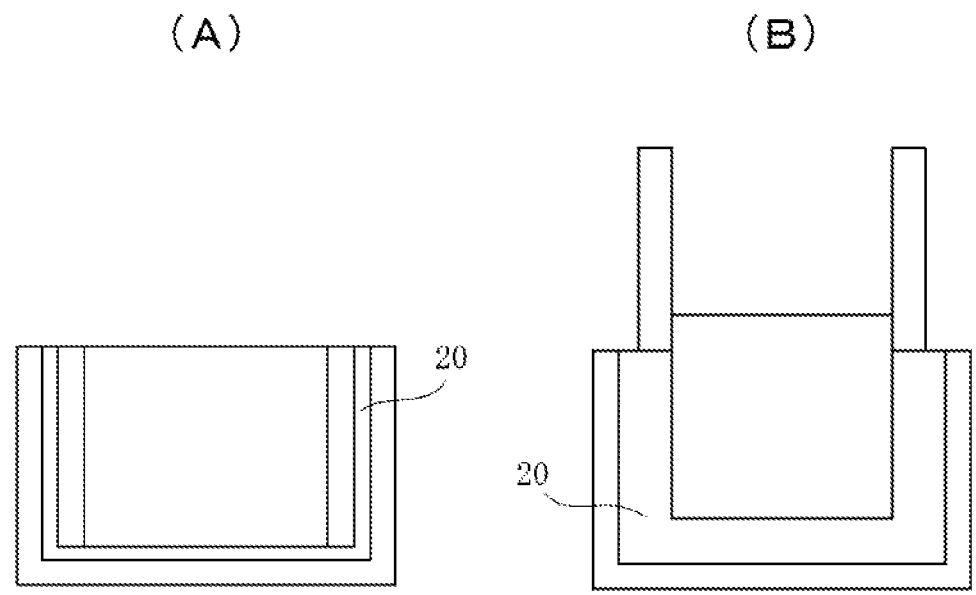
FIG. 6 is a diagram depicting the structure of a preferred example of a variable thickness constant temperature foam molded used in the manufacturing method according to the present invention.

The structure in a preferred example of a variable thickness, constant temperature foam mold (mold for injection molding) that is used in the manufacturing method according to the present invention is depicted in FIG. 6, where the hollow portion 20 in this mold is of a movable type.

In a first stage when carrying out form molding of the PLA resin, in a state wherein the thickness of the hollow portion 20 is thin (for example, 0.1 mm), the melted polymer is injected (referencing FIG. A in FIG. 6), and, in a second stage, the polymer temperature is reduced to an appropriate temperature of no greater than 100° C., to solidify the polymer, after which the hollow portion is expanded to the thickness for the foam expansion ratio that has been set in advance (for example, for a 20× foam at 2 mm) (referencing FIG. B of FIG. 6), foaming at no less than the softening point of the polymer over a time of between 30 seconds and 1 minute and cooling and hardening, to produce a molded article with a high foam expansion ratio simultaneously with molding.

In this injection molding cycle, there are forming and cooling intervals in the cycle, and thus the injection molding cycle is longer than a typical cycle, which is cooling only. In order to shorten the cycle time, a multiple foam mold injection molding apparatus is preferred wherein the molded articles are removed while switching a plurality of molds.

In the polylactic acid foam molded article manufacturing method according to one aspect according to the present invention, a grinding orifice portion is provided in the injection molding machine (referencing FIG. 5), and a hollow portion variable thickness/constant temperature foam mold (referencing FIG. 6) is used, where polylactic acid with excessively high molecular weight of 2,000,000 or more is physically and mechanically pulverized through the application of shearing forces, in the presence of a supercritical or subcritical foaming gas, and cross-linked through polyisocyanate or epoxy groups, to perform foam manufacturing, at no greater than 100° C. and no less than the softening point, a foam molded article from a polylactic acid foam molding material with an MI value of between 0.05 and 5, measured in accordance with JIS K 7210 at 190° C. and a load of 21.6 kg.

The MI value measurement in the present invention is carried out through measuring the weight g of the flow over a 10-minute time enteral, or a weight g for an equivalent of 10 minutes time, with an orifice diameter of 2 mm, an orifice length of 10 mm, at 190° C., with a load of 21.6 kg for the polylactic acid foam molding material, and an orifice diameter of 1 mm, an orifice length of 10 mm, at 190° C., and a load of 2.16 kg for the cross-linked polylactic acid raw material, based on JIS K 7210. For the measurement of the foam expansion ratio, 1 mL of the foam molded article is cut out to measure the weight g1, and 1 mL of the polylactic acid foam molding material according to the present invention is cut out to measure a weight g2, and the net of g2 less g1 is calculated. The water content ratio of the raw material polylactic acid, or the like, was measured using the Karl Fischer method. The thermal durability of the foam molded article was evaluated as "Good" if there was no deformation even after three minutes after filling, to an 80% depth, a manufactured box-shaped molded article with 90° C. hot water, and evaluated as "Excellent" if there was no deformation even after three minutes, after similarly filling with boiling water. If deformation is visible after filling with hot water, the result was "Fail." The measurement of remarkably large polymers was through measuring the PSt equivalent molecular weight distribution through GPC.

While more details of the present invention will be explained through the embodiments, the present invention is not limited to these embodiments.

Note that the reaction extruder and injection molding machine described above can be used also when manufacturing the cross-linked polylactic acids (A), (B), (C), and (E) that are the starting raw materials.

Raw material polylactic acids corresponding to the three types having different D isomer/L isomer ratios, used in achieving the primary object of the present invention, are not commercially available, and thus three types of raw material polylactic acids, with D/L=13/87, D/L=19/81, and D/L=25/75 were manufactured using the methods described below (Manufacturing Examples 1 through 3). In Manufacturing Examples 1 through 3, commercially available L lactides and D lactides were refined through recrystallization with ethyl acetate. Mixing was performed so that the total of the parts by weight of the refined D lactides and the parts by weight of the L lactides was 100, and 0.5 parts by weight of tin octylate, as a catalyst, was loaded into an autoclave equipped with a stirring device, and after vacuum degassing, ring opening polymerization was performed, in an $N_2$ ambient gas, under polymerizing conditions of 190° C. and one hour. After completion of the reaction, the polymer was removed from the autoclave in a stick shape, and, after quenching, was cut using a rotary cutter to manufacture non-cross-linked polylactic acid pellets. After these pellets were dried in a vacuum dryer for 24 hours at 80° C., they were placed in a nitrogen-filled aluminum bag for storage until use. Material having a water content ratio of no greater than 100 ppm was used for the raw material polylactic acid.

EMBODIMENTS (Manufacturing Machine 1) Extruder

The schematic structure of a preferred extruder in an embodiment according to the present invention is depicted in FIG. 1. A nitrogen gas-sealed Henschel mixer 1, a raw material supply hopper 2, and a front stage gear pump portion 5, for the purposes of moving a PLA melt reliably, and of preventing backflow of the supercritical gas, are provided, where nitrogen gas was supplied from a nitrogen gas canister, a nitrogen gas supply side plunger pump, and an accumulator tank, for the purpose of stabilizing the gas pressure, through a pressure reducing valve and a flow rate controlling valve, to a gas filling hole. An orifice portion 6 was provided for the purpose of physically reducing the molecular weight, in the presence of a supercritical inert gas, and simultaneously pulverizing mechanically to the application of shearing forces.

Note that the supercritical state is maintained from the front stage gear pump portion 5 through the orifice portion 6. An oil diffusion vacuum pump 7 and a low-pressure nitrogen gas recovering portion were connected from a vent hole 8, where the nitrogen gas recovered was passed through a moisture trapping device and reused. The interval from the orifice portion 6, and, in particular, from the Out hole of the slitted plate (FIG. 4) to the inlet of the back stage gear pump portion 9 is placed under vacuum by a vacuum pump, and degassed and dewetted, to produce a no-pressure release space. In this no-pressure release space, recombination of the cross-linking portions of the PLA that has been subjected to physical molecular weight reduction and mechanical pulverization takes place rapidly. The PLA melt is pressed by the back stage gear pump portion to arrive at dice of a submerged cutter 10. A processing system was used wherein the round pellets of polylactic acid foam molding material according to the present invention, obtained from the outlet of the submerged cutter, are fed into a dry hopper, and after a prescribed time has elapsed, are dried by a vacuum dryer.

(Manufacturing Example 1) Manufacturing of the Starting Raw Material A (Round Cross-Linked Polylactic Acid Pellets The extruder explained for the Manufacturing Machine 1 was used to supply quantitatively, to the Henschel mixer, into 100 parts by weight of a polylactic acid raw material with D/L=13/87 and a number-average molecular weight of 100,000, adducts of a 1, 6-hexamethylene diisocyanate and trimethylol propane, which are liquid at room temperature, at 1.5 parts by weight, 1 parts by weight, and 0.5 parts by weight, respectively, and 1 part by weight of a talc ultra powder with an average particle size of 0.4 μm, to be mixed therein, and to supply, at a constant rate, from a nitrogen gas sealed hopper to an extruder, where 0.2% by weight nitrogen gas, relative to the polylactic acid foam molding material, was supplied continuously at a constant rate from a first stage gas filling hole, to manufacture round pellets (A1), (A2), and (A3) wherein polylactic acids with polystyrene-equivalent molecular weight of 2,000,000 or more, in a GPC measurement, were subjected to physical molecular weight reduction, in the presence of supercritical nitrogen gas, and mechanical pulverization through the application of shearing forces, and recombined. The MI values thereof, under a load of 2.16 kg, were respectively 1.1, 1.3, and 1.6.

(Manufacturing Example 2) Manufacturing of the Starting Raw Material B (Round Cross-Linked Polylactic Acid Pellets 100 parts by weight of a D/L=19/81 polylactic acid raw material with a number-average molecular weight of 100, 000, and the same cross-linking agents and talc as in Manufacturing Example 1 were each supplied and mixed to manufacture round pellets (B1), (B2), and (B3). The MI values thereof, under a load of 2.16 kg, were respectively 1.0, 1.2, and 1.5.

(Manufacturing Example 3) Manufacturing of the Starting Raw Material C (Round Cross-Linked Polylactic Acid Pellets 100 parts by weight of a D/L=25/75 polylactic acid raw material with a number-average molecular weight of 100, 000, and the same cross-linking agents and talc as in Manufacturing Example 1 were each supplied and mixed to manufacture round pellets (C1), (C2), and (C3). The MI values thereof, under a load of 2.16 kg, were respectively 0.9, 1.1, and 1.4.

(Manufacturing Example 4) Manufacturing of the Starting Raw Material E (Round Cross-Linked Polylactic Acid Pellets A total of 100 parts by weight, being 30 parts by weight of a D/L=13/87 polylactic acid raw material, 33 parts by weight of a D/L=19/81 polylactic acid raw material, 37 parts by weight of a D/L=25/75 polylactic acid raw material, with number-average molecular weights of 100,000 each, and the same cross-linking agents and talc as in Manufacturing Example 1 were each supplied and mixed to manufacture round pellets (E1), (E2), and (E3). The MI values thereof, under a load of 2.16 kg, were respectively 0.30, 0.42, and 0.54.

(Manufacturing Machine 2) Injection Molding Machine

A nitrogen gas sealed Henschel mixer 1 and a raw material supply hopper 2 were installed on an apparatus wherein the typical known injection molding machine having a basic structure as depicted in FIG. 5 was modified. Gas jet holes 24, an orifice portion 6, a cooling adapter 23, and a shutoff nozzle 14 were provided in a modified tip end portion, in a structure wherein the shutoff nozzle and the filling hole 15 for the foam mold in contact. A processing system was used wherein the foaming gas supplying portion injected an appropriate amount, from a nitrogen gas canister through a pressure-reducing valve, adjusted by a piston 18 that is connected to the injection molding machine movable portion main unit and by the pressure reducing valve, is held temporarily in a side cylinder 17 and then, synchronized to the injection extrusion cycle, is injected from the gas jet holes into the PLA melt.

(Embodiment 1) Injection Foam Molding

The injection molding machine of Manufacturing Machine 2 was used to supply quantitatively, to a Henschel mixer, 30 parts by weight of the cross-linked polylactic acid round pellets (A1), 33 parts by weight of the round pellets (B1), and 37 parts by weight of the round pellets (C1), manufactured in Manufacturing Examples 1 through 3, and stirred and mixed, to be supplied at a constant rate to an injection molding machine from a nitrogen gas sealed hopper. Nitrogen gas was injected at 2% by weight, relative to the polylactic acid foam molding material, from the nitrogen gas supply side cylinder, to reduce the molecular weight, and to cause recombination, in the orifice portion (with a slitted plate thickness of 0.2 mm, a slit groove width of 2 mm, and a slit length of 35 mm), illustrated in FIG. 4, which was maintained at 170° C., in the presence of supercritical nitrogen gas, of polylactic acid with a polystyrene equivalent molecular weight of 2,000,000 or more, in a GPC measurement, produced when melting, to extrude, with a 30-second stroke, into a filling hole 15 of a box-shaped mold, with a thickness of 10 mm, a depth of 90 mm, an external length and width of 100 mm, maintained at 40° C., to manufacture injected foam molded articles T1 according to the present invention with different amounts of cross-linking agents.

T2 was manufactured in the same way from round cross-linked polylactic acid pellets (A2), (B2), and (C2).

Additionally, T3 was manufactured in the same way from round cross-linked polylactic acid pellets (A3), (B3), and (C3).

The foam expansion ratios in T1, T2, and T3 were 22×. The thermal durabilities were all "Excellent." The MI values for T1, T2, and T3, measured at 190° C. at a load of 21.6 kg, were 0.21, 0.31, and 0.42, respectively. Moreover, no remarkably high molecular weight material, with a polystyrene equivalent of 1,500,000 or more in a GPC measurement, was detected in T1, T2, or T3.

In order to compare the results of T1, T2, and T3 in the previous paragraph, (E1) was loaded, instead of (A1), (B1), and (C1), in the same manner as in the first embodiment, to manufacture E1. Similarly, E2 was manufactured through loading (E2) instead of (A2), (B2), and (C2). Similarly, E3 was manufactured through loading (E3) instead of (A3), (B3), and (C3). The foam expansion ratios in E1, E2, and E3 were 16×. The thermal durabilities were all "Excellent." The MI values for E1, E2, and E3, measured at 190° C. at a load of 21.6 kg, were 0.30, 0.42, and 0.54, respectively. Moreover, no remarkably high molecular weight material, with a polystyrene equivalent of 1,500,000 or more in a GPC measurement, was detected in E1, E2, or E3. Moreover, in Manufacturing Example 4, the result of loading the three types of polylactic acid simultaneously to manufacture the starting raw materials E1, E2, and E3 was the discovery that there was a clear negative effect on performance, when compared to the result of manufacturing using T1, T2, or T3, despite having the identical raw material structures. This is believed to be caused by having less opportunity for the appearance of the three-dimensional parallel structures.

(Reference Example 1) Injection Foam Molding

For comparison, the slits of the orifice portion that would reduce the molecular weight and apply shearing forces were removed from the extruder in Manufacturing Machine 1, and despite the other conditions being identical, the pressure indicated by the resin pressure gauge 11 was 0.6 MPa, and pellets corresponding to the round cross-linked polylactic acid pellets (A1), (A2), (A3), (B1), (B2), (B3), (C1), (C2), and (C3) were manufactured in a state wherein the supercritical point for nitrogen gas was not reached, and also the orifice portion of the injection molding machine of Manufacturing Machine 2 was removed and reference products corresponding to Injection Foam Products T1, T2, and T3 were manufactured, where, in all, the foam expansion ratio was less than 5×, and in some places the foam expansion ratios were nonuniform. Because the foam expansion ratio could not be increased as specified, it was not possible to mold into box shapes. Heavy materials with remarkably high molecular weights, in excess of polystyrene equivalents of 2,000,000 in GPC measurements, were measured at greater than 1% by weight.

This suggests that, because the slits of the orifice portion 6, which apply the shearing forces, were removed, the polylactic acid foam molding material with the remarkably high molecular weights interfered with stretching of the foam cell film, preventing an increase in the foam expansion ratio.

(Embodiment 2) Injection Foam Molding

The respective starting raw materials were manufactured through the process in Manufacturing Examples 1 through 3, only changing the talc ultra powder to 0.3 parts by weight, and foam molded articles according to the present invention corresponding to T1, T2, and T3, of Embodiment 1, were manufactured in the same manner as in Embodiment 1. The MI values with a load of 21.6 kg of the foam molded articles according to the present invention were unchanged, at 0.4, 0.3, and 0.2, respectively, but the thermal durabilities were "Good."

(Reference Example 2) Injection Foam Molding

Foam molded articles manufactured using the same steps as the manufacturing method for T1 in the first embodiment, without changing the parts by weight of the polylactic acid raw materials or talc from those in Manufacturing Examples 1 through 3, but rather changing only the blending quantity of the adduct of 1,6-hexamethylene diisocyanate and trimethylol propane to 0.1 parts by weight, had an MI value of 6 with a load of 21.6 kg, with inadequate viscosity, and a low foam expansion ratio, where molding into a box-shaped was not possible.

(Reference Example 3) Injection Foam Molding

Foam molded articles manufactured using the same steps as the manufacturing method for T1 in the first embodiment, without changing the parts by weight of the polylactic acid raw materials or talc from those in Manufacturing Examples 1 through 3, but rather changing only the blending quantity of the adduct of 1,6-hexamethylene diisocyanate and trimethylol propane to 3 parts by weight, had an MI value of 0.003 with a load of 21.6 kg, with viscosity that was too high, and a low foam expansion ratio, where molding into a box-shaped was not possible.

(Embodiment 3) Injection Foam Molding

The injection molding machine of Manufacturing Machine 2 was used to supply quantitatively, to a Henschel mixer, 40 parts by weight of the cross-linked polylactic acid round pellets (A1), 30 parts by weight of the round pellets (B1), and 30 parts by weight of the round pellets (C1), manufactured in Manufacturing Examples 1 through 3, and stirred and mixed, to be supplied at a constant rate to an injection molding machine from a nitrogen gas sealed hopper. A mixed gas of a nitrogen gas and methanol volume ratio of 2:1 was injected at 2% by weight, relative to the polylactic acid foam molding material, from the nitrogen gas supply side cylinder, and a polylactic acid with a polystyrene equivalent molecular weight of 2,000,000 or more, in a GPC measurement was injected, in the presence of supercritical nitrogen gas, into a foam molding mold (FIG. A in FIG. 6, with a hollow portion thickness of 0.2 mm) that which was maintained at 170° C. and equipped with an the orifice portion (with a slitted plate thickness of 0.2 mm, a groove width of 2 mm, and a slit length of 35 mm, illustrated in FIG. 4), and after the temperature of the injected polylactic acid reached 100° C., then, as illustrated in FIG. B of FIG. 6, the thickness of the hollow portion of the mold was changed to 4 mm to perform foaming for 30 seconds, and after that hollow portion had been achieved, the mold was cooled to 40° C. and maintained for 30 seconds, to manufacture an injection foam molded article T11 according to the present invention. T12 was manufactured in the same way from round cross-linked polylactic acid pellets (A2), (B2), and (C2).

Additionally, T13 was manufactured in the same way from round cross-linked polylactic acid pellets (A3), (B3), and (C3).

The foam expansion ratios in T11, T12, and T13 were 20×. The thermal durabilities were all "Excellent." The MIs, measured with a load of 21.6 kg, for T11, T12, and T13 were, respectively, 0.4, 0.3, and 0.2. Moreover, no remarkably high molecular weight material, with a polystyrene equivalent of 1,500,000 or more in a GPC measurement, was detected in T11, T12, or T13.

(Embodiment 4) Bead Foam Molded Articles The dice of the submerged cutting portion of the extruder explained in Manufacturing Machine 1 was substituted with dice having small-diameter holes of 0.8 mm. Round cross-linked polylactic acid pellets manufactured in Manufacturing Examples 1 through 3 were supplied quantitatively, at 33.3 parts by weight (A1), 33.3 parts by weight (B2), and 33.3 parts by weight (C1) into a Henschel mixer and stirred and mixed, and a prescribed amount was supplied from a nitrogen gas sealed hopper to an extruder, and a prescribed amount of nitrogen gas was supplied continuously at 0.2% by weight relative to the polylactic acid foam molding material, from a front stage gas filling hole to cause polylactic acid with a polystyrene-equivalent molecular weight of 2,000,000 or more in a GPC measurement to undergo physical molecular reduction, and to apply shearing forces, to cause mechanical pulverization and recombination to manufacture round polylactic acid foam molding material pellets according to the present invention with a diameter of (1 mm) (T4).

(T5) was manufactured in the same way from round pellets (A2), (B2), and (C2).

Additionally, (T6) was manufactured in the same way from round pellets (A3), (B3), and (C3).

The 100 parts by weight of the round pellets (T4) and 5 parts by weight of a 2:1 solution of isobutane and methanol was placed in an autoclave, and after being held at 70° C. for one hour, was cooled to room temperature, to manufacture foam beads T4 according to the present invention.

Foam beads T5 were manufactured in the same way from the round pellets (T5).

Moreover, foam beads T6 were manufactured in the same way from the round pellets (T6).

Prescribed quantities of the beads T4, T5, and T6 were each placed in a mold, and heated and foam for one minute by steam, to manufacture a polylactic foam molding material foam molded article according to the present invention. The foam expansion ratios of the foam molded articles were 28×. The thermal durabilities were all "Excellent." The MI values of the foam molded articles, at 190° C. and a load of 21.6 kg, were 0.4 for T4, 0.3 for T5, and 0.2 for T6. Moreover, no remarkably high molecular weight material, with a polystyrene equivalent of 1,500,000 or more in a GPC measurement, was detected.

(Reference Example 4) Bead Foam Molded Articles

In the same way as in Embodiment 4, raw materials of 33.3 parts by weight (A1), 33.3 parts by weight (B2), and 33.3 parts by weight (C1), of the cross-linked polylactic acids manufactured in Manufacturing Examples 1 through 3, were used. For the manufacturing machine, the same manufacturing machine I as in Embodiment 4, with the dice of the submerged cutting portion replaced with dice with small diameter holes of 0.8 mm, was used, with the orifice portion 6 in order to compare with Embodiment 4. While the operating conditions were identical to those in the fourth embodiment, the dice holes were blocked from the beginning of the operation, so that only irregular thread-shapes or flat shapes, or the like, could be produced, so manufacturing of round pellets was not possible. Moreover, because the dice were blocked, the vent hole 8 was "vented up," preventing the operation from continuing. The melt immediately prior to arrival at the dice hole was extracted, and in a GPC measurement heavy materials with remarkably high molecular weights with polystyrene-equivalent molecular weights in excess of 2,000,000 were detected at 1% by weight or more. It is believed that the cause is that there is no orifice portion that would impede the flow of the polylactic acid melt in the stage after the thick viscosity portion 21, triggering a reduction in pressure at the thick viscosity portion outlet, causing there to be a large differential pressure between the inlet and the outlet of the thick viscosity portion, accelerating the thermal breakdown of the cross-linking portions due to the heat that is produced in the thick viscosity portion, and because there is no orifice portion, there is no narrowing of the flow direction from the resin pressurizing direction after the back portion of the thick viscosity portion, flow in the crosswise direction also consumes time, so that gradually disorderly re-combinations were produced continuously.

Because round pellet manufacturing was not possible in Reference Example 4, in the state wherein the orifice portion 6 had been removed, the dice of the submerged cutting portion were substituted to the normal dice with 3.2-mm holes, in the state wherein the orifice portion 6 was removed. In the same manner as with the operation in Embodiment 4, 33 parts by weight of (A1), 33 parts by weight of (B1), and 33.3 parts by weight of (C1) were provided quantitatively to the extruding machine, and in a state wherein there was no grinding orifice, around polylactic acid foam molding material with a diameter of approximately 5 mm (T7) were manufactured.

(T8) was manufactured in the same way from round pellets (A2), (B2), and (C2).

Additionally, (T9) was manufactured in the same way from round pellets (A3), (B3), and (C3).

The 100 parts by weight of the round pellets (T7) and 5 parts by weight of a 2:1 solution of isobutane and methanol was placed in an autoclave, and after being held at 70° C. for one hour, was cooled to room temperature to manufacture foam beads T7.

Foam beads T8 were manufactured in the same way from the round pellets (T8).

Moreover, foam beads T9 were manufactured in the same way from the round pellets (T9).

Prescribed quantities of the beads T7, T8, and T9 were each placed in a mold, and heated and foam for one minute by steam, to manufacture a polylactic foam molding material foam molded article. The foam expansion ratios of the foam molded articles were 15×. While the thermal durabilities were all excellent, many foam cells ranging from 5 mm to 10 mm were included in the foam article, and it was determined that the foam article was weak in terms of strength and poor in terms of practical use. The MI values of the foam molded articles, at 190° C. and a load of 21.6 kg, were 0.4 for T7, 0.3 for T8, and 0.2 for T9. Moreover, remarkably high molecular weight materials, with polystyrene equivalents of 2,00,000 or more in a GPC measurement, were detected. It is believed that the large amount of these materials with high molecular weights was caused by the production of large foam cells during degassing. Because forming was performed within a sealed space within the mold, the apparent foam expansion ratio was 15×, but it can be envisioned easily that there would be a further reduction in the foam expansion ratio through degassing the large foam cells, and the effects of the slits in the orifice portion were proven through Reference Example 4.

(Manufacturing Machine 3) Extrusion Foam Molding Sheet Molding Machine

Figure 9:
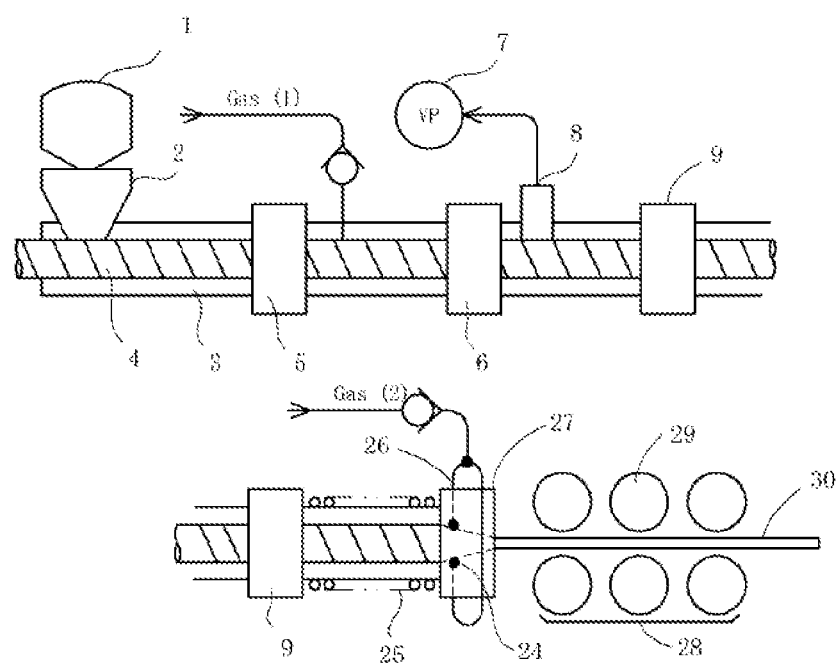
FIG. 9 is a diagram depicting a preferred structure for a foam sheet molding extruder used in the manufacturing method according the present invention.

The schematic structure of a preferred extruded foam sheet manufacturing machine in an embodiment according to the present invention is depicted in FIG. 9. In FIG. 9, from the Henschel mixer 1 to the inlet of the back stage gear pump 9 is the same as for the structure and detail explained using Manufacturing Machine 1. The PLA melt that is compressed by the back stage gear pump is cooled, by a cooling portion 25, while, prior to a T-die, there is a supply from Gas (2) through a foaming gas filling hole 26, to be injected into the PLA melt from gas jet holes disposed in at least two locations (a group of a large number of extremely small-diameter jet holes). After spraying in a sheet shape from the T-die 27, the material is received by a pulling device 28, and further cooled by a cooling roller 29 within the pulling device 28, to manufacture an extruded foam molded sheet 30 according to the present invention.

(Embodiment 5) Extruded Foam Molded Sheet

The extrusion foam molding sheet molding machine of Manufacturing Machine 3 was used, and 50 parts by weight of the round pellets (A1), 25 parts by weight of the round pellets (B1), and 25 parts by weight of the round pellets (C1), of the cross-linked polylactic acids manufactured in Manufacturing Examples 1 through 3, were supplied quantitatively to the Henschel mixer 1 and mixed, to be supplied quantitatively from the nitrogen gas sealed hopper to the extruder, where 1.0% by weight of a 2:1 weight ratio of nitrogen gas and methanol was supplied continuously and quantitatively, in respect to the polylactic acid foam molding material, from a front stage gas filling hole, and polylactic acid with a polystyrene equivalent molecular weight of 2,000,000 or more, in a GPC measurement, was passed through an orifice portion 6, in the presence of a supercritical inert gas, to be subjected to physical molecular weight reducing and pulverization through the application of a mechanical shearing force, followed by cooling to 100° C., to extrude, in a sheet shape with a thickness of 0.5 mm and a width of 30 cm, into a sheet pulling device, set to a thickness of 10 cm, maintained at 100° C. After a foam molding part that is held at 100° C. for 30 seconds, it is passed through a 40° C. cooling roll part, and cut into prescribed lengths in a state that is cooled to 5° C. lower than the Tg of the polylactic acid, to manufacture a foam molded sheet T21 according to the present invention.

T22 was manufactured in the same way from round cross-linked polylactic acid pellets (A2), (B2), and (C2).

Additionally, T23 was manufactured in the same way from cross-linked polylactic acid pellets (A3), (B3), and (C3).

The thermal durabilities of the sheets T21, T22, and T23 were "Excellent." The MIs, measured with a load of 21.6 kg, for these foam molded articles T21, T22, and T23 were, respectively, 0.4, 0.3, and 0.2. Moreover, no remarkably high molecular weight material, with a polystyrene equivalent of 1,500,000 or more in a GPC measurement, was detected.

EXPLANATIONS OF REFERENCE SYMBOLS

1 Henschel mixer
2 Hopper
3 Cylinder
4 Screw
5 Front stage gear pump
6 Orifice portion or grinding orifice portion
7 Vacuum pump
8 Vent hole
9 Back stage gear pump portion
10 Submerged cutter
11 Resin pressure gauge
12 Slitted plate
13 Dividing plate
14 Shutoff nozzle
15 Mold filling hole
16 Electromagnetic valve
17 Side cylinder (air cylinder)
18 Piston
19 Movable portion
20 Hollow portion
21 Thick portion
22 Pressure reducing/expanding portion or degassing/dewetting portion
23 Cooling adapter
24 Gas jet hole
25 Cooling portion
26 Foaming gas filling hole
27 T-die
28 Pulling device
29 Cooling roll
30 Extruded foam molded sheet

The invention claimed is:

1. A polylactic acid foam molding material made from three types of polylactic acids (A), (B), and (C) having differing structural proportions of D isomers and L isomers, and between 0.2 and 2.0 parts by weight of a cross-linking agent having epoxy groups or polyisocyanate groups, relative to a total of 100 parts by weight for the polylactic acids, wherein no polylactic acid with a polystyrene-equivalent molecular weight of 2,000,000 or more, in a GPC measurement, is included, the weight proportions of the polylactic acids (A):(B):(C) are 25-50:25-50:25-50 (wherein (A)+(B)+(C)=100), and wherein the M I value, measured in accordance with JIS K 7210 at 190° C. and a load of 21.6 kg, is between 0.05 and 5.

2. A polylactic acid foam molding material as set forth in claim 1, wherein:
the structural proportions (D/L) for the D isomers and the L isomers in the polylactic acids (A), (B), and (C), are DA/LA=5 to 20/95 to 80 (where DA+LA=100) for the polylactic acid (A), DB/LB=(DA+3 to DA+10)/(LA−3 to LA−10) (where DB+LB=100) for the polylactic acid (B), and DC/LC=(DB+3 to DB+10)/(LB−3 to LB−10) (where DC+LC=100) for the polylactic acid (C).

3. A polylactic acid foam molding material as set forth in claim 1 or 2, wherein:
calcium carbonate or talc microparticles are included at between 0.5 and 5 parts by weight relative to a total of 100 parts by weight of the polylactic acids.

4. A foam molded article made from a polylactic acid foam molding material as set forth in claim 1 or 2.

5. A foam molded article as set forth in claim 4, wherein:
a shape of the molded article is maintained after filling said molded article with hot water at 90° C.

6. A method for manufacturing a polylactic acid foam molding material having an MI value, measured in accordance with JIS K 7210 at 190° C. and a load of 21.6 kg, of between 0.05 and 5, including: a step for preparing three types of cross-linked polylactic acids (A), (B), and (C), having differing structural proportions of D isomers and L isomers, obtained by subjecting, to physical or mechanical molecular weight reduction, in the presence of a supercritical inert gas, and recombination, products produced through a cross-linking reaction of 100 parts by weight of polylactic acids structured from D isomers and L isomers and between 0.2 and 2.0 parts by weight of cross-linking agents having epoxy groups or polyisocyanate groups; and a step for mixing the cross-linked polylactic acids (A), (B), and (C) at weight proportions of 25-50:25-50:25-50 (wherein (A)+(B)+(C)=100), and performing physical or mechanical molecular weight reduction, in the presence of a super critical inert gas, and recombining, on a polylactic acid with a polystyrene-equivalent molecular weight of no less than 2,000,000 in a GPC measurement, produced when melting the mixture.

7. The method for manufacturing a polylactic acid foam molding material as set forth in claim 6, wherein: the structural proportions (D/L) for the D isomers and the L isomers in the cross-linked polylactic acids (A), (B), and (C), are DA/LA=5 to 20/95 to 80 (where DA+LA=100) for the cross-linked polylactic acid (A), DB/LB=(DA+3 to DA+10)/(LA−3 to LA−10) (where DB+LB=100) for the cross-linked polylactic acid (B), and DC/LC=(DB+3 to DB+10)/(LB−3 to LB−10) (where DC+LC=100) for the cross-linked polylactic acid (C).

8. A method for manufacturing a polylactic acid foam molding material having an MI value, measured in accordance with JIS K 7210 at 190° C. and a load of 21.6 kg, of between 0.05 and 5, including:

a step for mixing three types of polylactic acids (A), (B), and (C), having differing structural proportions of D isomers and L isomers, at weight proportions of 25-50:25-50:25-50 (wherein (A)+(B)+(C)=100); and a step for performing physical or mechanical molecular weight reduction, in the presence of a super critical inert gas, and recombining, on a polylactic acid with a polystyrene-equivalent molecular weight of no less than 2,000,000 in a GPC measurement, produced through a cross-linking reaction of 100 parts by weight of the polylactic acid mixture from the previous step and between 0.2 and 2.0 parts by weight of a cross-linking agent having epoxy groups or polyisocyanate groups.

9. A method for manufacturing a polylactic acid foam molding material as set forth in claim 8, wherein:

the structural proportions (D/L) for the D isomers and the L isomers in the polylactic acids (A), (B), and (C), are DA/LA=5 to 20/95 to 80 (where DA+LA=100) for the polylactic acid (A), DB/LB=(DA+3 to DA+10)/(LA−3 to LA−10) (where D B+LB=100) for the polylactic acid (B), and DC/LC=(DB+3 to DB+10)/(LB−3 to LB−10) (where DC+LC=100) for the polylactic acid (C).

10. A method for manufacturing a foam molded article of a polylactic acid foam molding material having an M I value, measured in accordance with JIS K 7210 at 190° C. and a load of 21.6 kg, of between 0.05 and 5, including:

a step for preparing three types of cross-linked polylactic acids (A), (B), and (C), having differing structural proportions of D isomers and L isomers, obtained by subjecting, to physical or mechanical molecular weight reduction, in the presence of a supercritical inert gas, and recombination, products produced through a cross-linking reaction of 100 parts by weight of polylactic acids structured from D isomers and L isomers and between 0.2 and 2.0 parts by weight of cross-linking agents having epoxy groups or polyisocyanate groups; and a step for performing foam molding by discharging, at a temperature that is no less than a softening point and no greater than 110° C., a polylactic acid foam molding material produced through mixing the cross-linked polylactic acids (A), (B), and (C) at weight proportions of 25-50:25-50:25-50 (wherein (A)+(B)+(C)=100), and performing physical or mechanical molecular weight reduction, in the presence of a supercritical inert gas, and recombining, on a polylactic acid with a polystyrene-equivalent molecular weight of no less than 2,000,000 in a GPC measurement, produced when melting the mixture.

11. A method for manufacturing a foam molded article of a polylactic acid foam molding material as set forth in claim 10, wherein:

calcium carbonate or talc microparticles are included at between 0.5 and 5 parts by weight relative to 100 parts by weight of the mixture.

12. A method for manufacturing a foam molded article of a polylactic acid foam molding material having an MI value, measured in accordance with JIS K 7210 at 190° C. and a load of 21.6 kg, of between 0.05 and 5, including:

a step for mixing three types of polylactic acids (A), (B), and (C), having differing structural proportions of D isomers and L isomers, at weight proportions of 25-50:25-50:25-50 (wherein (A)+(B)+(C)=100); and a step for performing foam molding by discharging, at a temperature that is no less than a softening point and no greater than 110° C., a polylactic acid foam molding material formed through performing physical or mechanical molecular weight reduction, in the presence of a supercritical inert gas, and recombining, on a polylactic acid with a polystyrene-equivalent molecular weight of no less than 2,000,000 in a GPC measurement, produced through a cross-linking reaction of 100 parts by weight of the polylactic acid mixture from the previous step and between 0.2 and 2.0 parts by weight of a cross-linking agent having epoxy groups or polyisocyanate groups.

13. A method for manufacturing a foam molded article of a polylactic acid foam molding material as set forth in claim 12, wherein:

calcium carbonate or talc microparticles are included at between 0.5 and 5 parts by weight relative to 100 parts by weight of the polylactic acid mixture.

14. A foam molded article manufactured using a manufacturing method as set forth in any one of claim 10 through 13.

15. A foam molded article as set forth in claim 14, wherein: a shape of the molded article is maintained after filling said molded article with hot water at 90° C.

16. A foam molded article as set forth in claim 4, wherein the polylactic acid foam molding material further comprises calcium carbonate or talc microparticles included at from 0.5 to 5 parts by weight relative to a total of 100 parts by weight of the polylactic acids.

* * * * *